United States Statutory Invention Registration [19]

[11] Reg. Number: H192

Daehler [43] Published: Jan. 6, 1987

[54] SATELLITE ALIGNMENT SENSOR

[75] Inventor: Max Daehler, Belmont, Calif.

[73] Assignee: The United States of America as represented by the Secretary of the Navy, Washington, D.C.

[21] Appl. No.: 567,587

[22] Filed: Jan. 3, 1984

[51] Int. Cl.[4] ..... G01B 11/26; G01C 1/00; G01J 1/20

[52] U.S. Cl. ..... 356/152; 356/141; 250/203 R

[58] Field of Search ..... 356/141, 152; 250/203 R

[56] References Cited

U.S. PATENT DOCUMENTS

| | | | |
|---|---|---|---|
| 2,411,879 | 12/1946 | Holmes | 88/14 |
| 3,713,740 | 1/1973 | Lillestrand et al. | 356/141 |
| 3,861,801 | 1/1975 | Peters et al. | 356/74 |
| 3,864,043 | 2/1975 | Russell | 356/152 |
| 3,951,550 | 4/1976 | Slick | 356/141 |
| 4,309,106 | 1/1982 | Smith | 356/121 |
| 4,314,761 | 2/1982 | Reymond et al. | 356/141 |
| 4,325,633 | 4/1982 | Gardner | 356/141 |
| 4,410,270 | 10/1983 | Zuckerman | 356/152 |

*Primary Examiner*—Stephen C. Buczinski
*Assistant Examiner*—Melissa Koltak
*Attorney, Agent, or Firm*—R. F. Beers; C. D. B. Curry; G. L. Craig

[57] ABSTRACT

An optical alignment sensor capable of receiving radiation from a collimated light source and subsequently providing orientation attitude and alignment data. Collimated light from the source impinges an aperture plate causing a shadow of the aperture plate pattern to fall across a two-dimensional photodetector array. Since the aperture pattern is larger than the active area of the array, only a portion of the light spots forming the aperture plate pattern will fall on the array. By varying the spacing of the apertures in the aperture plate in a known way, the light spots on the array can be associated with specific apertures in the aperture plate. From the location of specific light spots on the array, the angular orientation of the alignment sensor may be determined with respect to the incident beam.

20 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SATELLITE ALIGNMENT SENSOR

BACKGROUND OF THE INVENTION

1. Field of the Invention

The invention generally relates to detectors of electromagnetic radiation. More specifically, the invention relates to a radiation sensor providing attitude data for alignment of the sensor with respect to an impinging beam of radiation. Most specifically, the invention relates to a radiation sensor using a variable spacing aperture plate and a two-dimensional photodetector array to provide data for alignment of the sensor with respect to a ground-based laser illuminating the sensor.

2. Description of Prior Art

Detection of radiant energy in such a manner as to provide attitude/range information relating the sensor and the energy source is important in many areas and a variety of competing techniques exist within the prior art to provide such information.

One technique, typically found with tracking telescopes, uses a telescope with a photodetector or photodetector array at it's focal plane. The position of the image of the source, measured by the photodetector, provides the desired information. Generally, such lens systems are complex, relatively heavy, and have resolution limited to the quality of the lenses used. Further, such systems have angular range limited to that of the objective lens used. Lens having greater resolution and angular range may be used but only with much greater cost and complexity.

Another technique within prior art is that of using an array of highly directional receivers consisting of a dedicated photodetector and an associated electronic circuit for each discrete receiver. Such systems are typically very complex and expensive and resolution depends on the number and size of each receiver and the size of the overall arrays. Further, response time and resolution may be sacrificed due to vibration and speed restrictions inherent to mechanical systems.

A third technique is that of transforming the incoming radiation into a line image having a radiant power distribution along it's length. The angular orientation of the radiation source may then be determined by illuminating a linear array of discrete photodetectors and having the strongest signal from a given detector represent the angle of the source. Alternatively, the line image may be scanned by a single photodetector and the intensity variation along the line image may be peculiar to the angular incidence of the illuminating radiation.

The present invention avoids the use of lenses and their attendant sensitivity to environmental degradation. Further, greatly increased resolution and angular range is achieved with the present invention at far lower cost than equivalent systems using lenses. Finally, the present invention provides greater resolution and angular range with less size and complexity than conventional dedicated array or mechanically-scanned array systems. While conventional systems might provide equivalent resolution or angular range to the present invention, none can provide the combination achievable with the present invention.

SUMMARY OF THE INVENTION

The primary object of invention is to provide an improved sensor for supplying alignment information with respect to a collimated radiation source when illuminated by the source.

A further object of invention is to provide an improved satellite alignment sensor supplying alignment information with respect to a collimated radiation source when illuminated by the source.

Collimated radiation from an illuminating source impinges an aperture plate on the alignment sensor causing a shadow pattern of the aperture plate to fall across a two-dimensional photodetector array. Since the aperture pattern is larger than the active area of the array, only a portion of the light spots forming the shadow pattern of the aperture plate will fall on the array. By varying the spacing of the apertures in the aperture plate in a known way, the light spots on the array can be associated with specific apertures in the aperture plate. From the location of specific light spots on the array, the angular orientation of the alignment sensor may be determined with respect to the radiation source.

DESCRIPTION OF THE PREFERRED EMBODIMENT

The SLCSAT satellite system consists in part of twelve 1.25 meter diameter mirrors which must be accurately co-aligned and scanned as a group in order to return the light from an earth-based laser back to desired places on earth. To accomplish these functions, sensors are required that will measure the orientations of the mirrors with respect to the ground laser.

Figure 1:
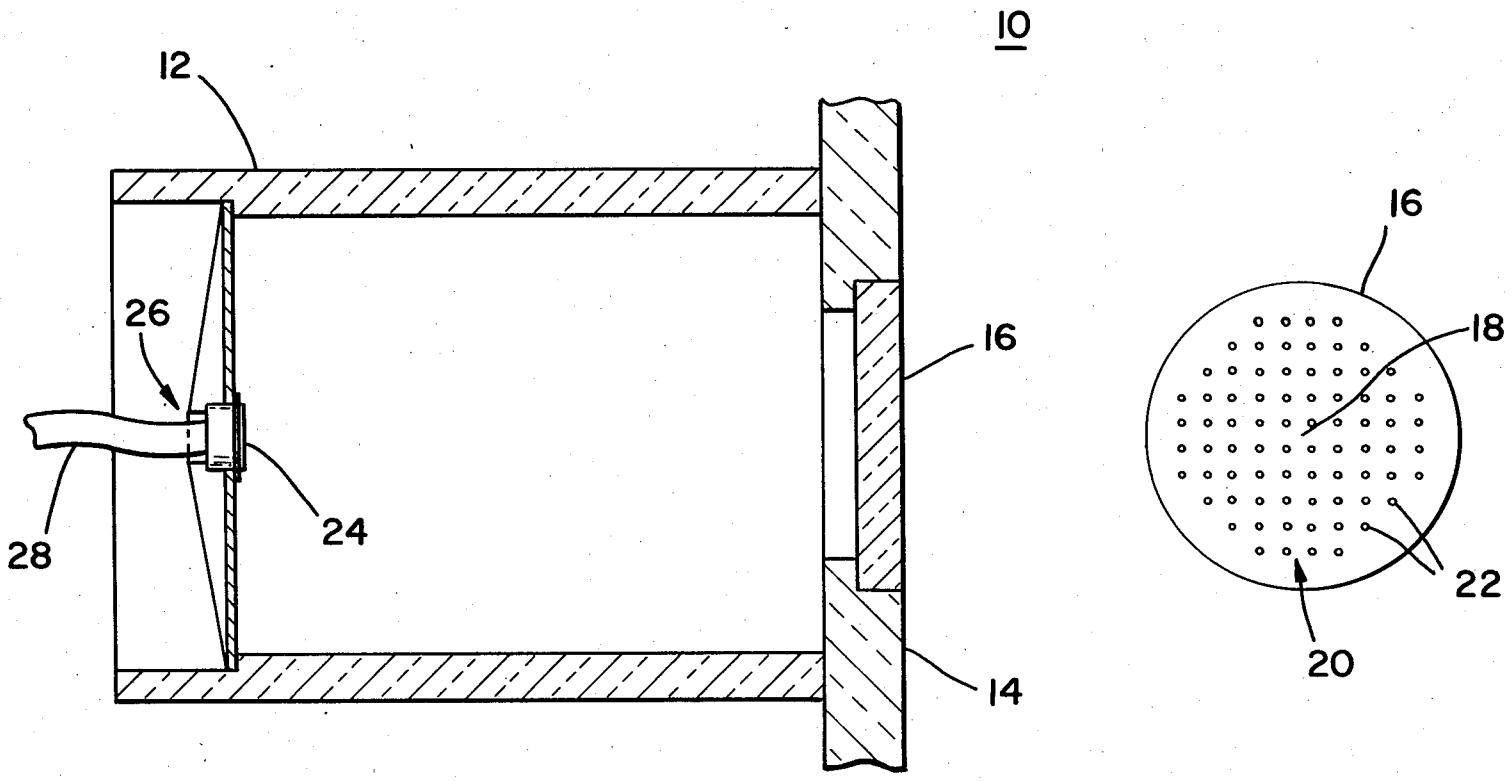
FIG. 1 is a schematic of an embodiment of the present invention.

Referring to FIG. 1, a schematic of the preferred embodiment of the present invention capable of providing such precise orientation data is shown. The sensor 10 is generally configured as a hollow cylinder 12. At one end, the cylinder 12 is rigidly attached to the surface 14 of one of the mirrors to be oriented. The cylinder 12 is coaxially aligned with a bore of smaller diameter through the surface 14 of the mirror such that the surface 14 both caps the cylinder 12 and acts as a mount for the entire sensor 10. In alternative embodiments of the present invention, the surface 14 of the mirror may be replaced by a generally disk-like cap rigidly attached to the cylinder 12. The cap would also have a central bore coaxially aligned with and of smaller diameter than the cylinder. However, the cap would have shoulder-like protrusions for mounting the sensor on the equipment to be oriented.

An aperture plate 16 is configured to fit into the bore such that it provides the only means of admitting radiation to the interior of the sensor 10. The aperture plate 16 consists of a radiation transparent disk 18, one side of which has an opaque coating in which is etched a rectangular array 20 of small circular apertures 22 having a predetermined variable spacing between rows and columns of the apertures 22. On the opposite side of the disk 18, there is a narrow-band filter coating 24 which passes the SLCSAT laser wavelength.

An the opposite end of the sensor 10 and coaxially aligned with the aperture plate 16 is an $N \times M$ element photodetector array 26 such as a charge-injection device (CID) or charge-coupled device (CCD). Photodetector arrays are currently available having $256 \times 256$ elements or 380×488 elements located on a rectangular grid and having 20 μm center-to-center spacing between elements. The actual aperture array and photodetector array design may be varied to fit the planned operational use. For example, greater sensitivity may be desired in one dimension than the other. Accordingly, both arrays could be fabricated as long thin rectangular shapes rather than as essentially square shapes.

In operation, collimated light from the radiation source will illuminate the aperture plate 16 causing an image of the aperture plate pattern, consisting of an array of light spots, to fall on the plane of the photodetecter array 26. The aperture pattern being larger than the active area of the array, only a part of the pattern will fall on the array. By way of example as used on the SLCSAT system and not limitation, the cell 12 of the present invention is 2.9 inches long, the width of the array 20 is 0.80 inches, and the apertures are 0.012 inches in diameter, resulting in at least four light spots on the detector array 26 at any time and sometimes as many as nine. This provides an angular range for the sensor of ±9.5°. The size of each aperture 22 just equals it's diffraction angle diameter and the apertures 22 as seen by the detector array 26 are 1.75° apart. In this example, the image of a single aperture 22 on the photodetecter array 26 is then about 0.024 inches diameter, equal to about 30 array pixels.

Figure 2:
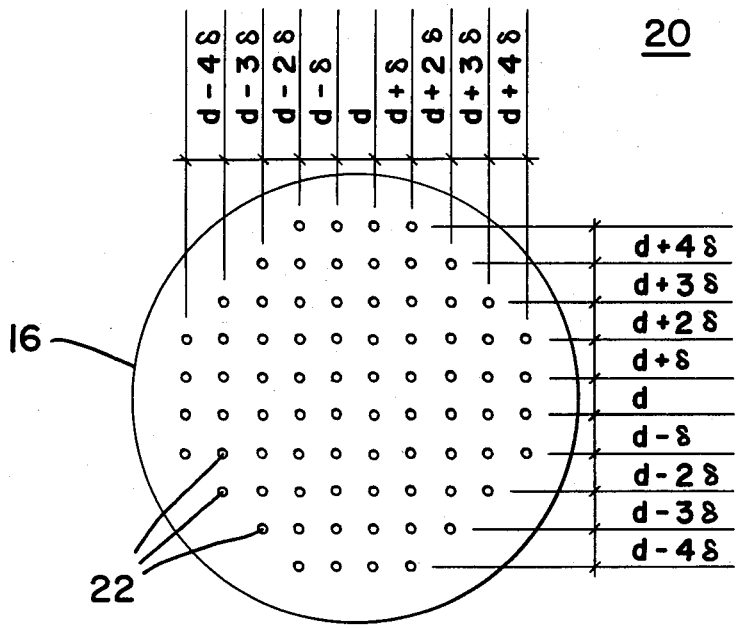
FIG. 2 is an enlarged view of the aperture plate of the present invention.

The angular orientation of the alignment sensor 10 relative to the direction of the incident SLCSAT laser beam will determine the locations of the spots of light on the photodetector array 26. The spots are identical and hence if an array of evenly spaced apertures were used, ambiguities would result in determining the sensor's orientation from the spot locations. All such ambiguities, however, can be eliminated by varying the spacings between the rows and columns of apertures. Referring to FIG. 2, the preferred embodiment of the aperture plate of the present invention is shown in which the spacing of each row or column differs from that of a neighboring row or column by a distance δ. That is, the enter-to-center spacing between the central two rows or columns of apertures 22 of the array 20 is made to have dimension, d, and the center-to-center spacing between rows or columns progressing outward from the center of the array 20 is made to have dimension $d \pm n\delta$. In such a case, the choice of sign is as shown in FIG. 2 and n is the number of the row or column of interest outward from the central portion of the array. The magnitude of δ is arbitrary, but it might, for example, equal the dimensions of one photodetector pixel. Thus for the array shown in FIG. 2, the row or column spacing of the apertures would range between four pixels more and four pixels less than the nominal 112 pixel spacing chosen for d.

Although in principle it is only necessary to read the pixels on which images of the apertures fall plus some of the nearby pixels, the read rate of the electronic circuitry of the preferred embodiment is higher when all pixels are read. Thus the entire photodetector array 26 is read each time a measurement is made by the sensor 10.

The electronic signal processing required to extract the sensor orientation from the output signals of the photodetector array 26 may be performed by: (1) locating the centroid of each light spot falling on the array; (2) calculating from the spot spacings the rows and columns to which the observed spots belong; (3) finding a best fit of the spot pattern (whose spacings are known) to the measured spot pattern; and (4) calculating the sensor orientation from the position of the spot pattern on the CID array. Alternative signal processing techniques may be used to determine the position of the pattern on the photodetector array that do not involve locating the centroid of each spot of light. The unique array of variably spaced light spots falling on the detector array permits, for example, a simple but very fast sum and shift operation to determine pattern position on the photodetector array.

The primary contributor to error in the alignment sensor's output is the uncertainty in measurement of the position of the light spots on the photodetector array. The achievement of high angular resolution by the sensor for single spot position measurements only would require considerable calibration data, perhaps as much as two numbers for each pixel in the aperture array. This would require an undesirably large memory. However, since the errors in spot position measurements are largely random, the overall error can be reduced by averaging over the four to nine spots available for every sensor measurement and over several sensor measurements. In effect, calibration of individual spot position measurements will be replaced by averaging many such measurements.

As noted previously, angular measurement error achievable by the instant invention is determined by the selection of the design of the aperture plate in conjunction with selection of the design of the photodetector array. An example of the accuracy achievable with the present invention is given below where the following assumptions are made: (1) the basic single spot measurement accuracy of the photodetector array is approximately 1/20 pixel; (2) averaging the measurements of four or more spots to obtain each spot pattern position measurement reduces the sensor uncertainty by a factor of approximately $\sqrt{4}$ or more; and (3) maintaining a moving average over numerous sensor measurements reduces error due to this source by approximately a factor of two. The corresponding angular measurement error obtained by the sensor according to these assumptions is 0.7 seconds. Finer or coarser measurement error may be achieved by choosing different design parameters for the aperture array and photodetector array.

What is claimed is:

1. A sensor for measuring the attitude of said sensor with respect to an incident beam of collimated radiation comprising:

(a) a housing;

(b) an aperture plate disposed in one end of said housing for receiving said incident beam, said aperture plate being opaque to said incident beam and having an array of circular apertures arranged in a predetermined pattern, said apertures being transparent to said incident beam, incident radiation passing through said apertures producing a radiation spot pattern related to the angle of incidence of said radiation relative to the sensor; and (c) means for detecting said spot pattern.

2. A sensor as recited in claim 1 wherein said aperture plate comprises:

(a) a radiation transparent element having an opaque coating disposed on one side, said radiation transparent element disposed in said housing so that incident radiation strikes said opaque coating;

(b) said opaque coating having an array of circular apertures arranged in a predetermined pattern.

3. A sensor as recited in claim 2 wherein said radiation transparent element has a narrow-band filter coating disposed on the side opposite said opaque coating, said narrow band filter coating passing said incident beam of collimated radiation.

4. A sensor as recited in claim 3 wherein said radiation transparent element is a radiation transparent disk.

5. A sensor as recited in claim 1 wherein said means for detecting said spot pattern includes:

(a) a photodetector array disposed behind said aperture plate so that at least a portion of said spot pattern falls on said photodetector array.

6. A sensor as recited in claim 5 wherein said photodetector array is a two-dimensional array.

7. A sensor as recited in claim 2 wherein said means for detecting said spot pattern includes:

(a) a photodetector array disposed behind said aperture plate so that at least a portion of said spot pattern falls on said photodetector array.

8. A sensor as recited in claim 6 wherein said photodetector array is a two-dimensional array.

9. A sensor as recited in claim 3 wherein said means for detecting said spot pattern includes:

(a) a photodetector array disposed behind said aperture plate so that at least a portion of said spot pattern falls on said photodetector array.

10. A sensor as recited in claim 6 wherein said photodetector array is a charge-injection device array.

11. A sensor as recited in claim 6 wherein said photodetector array is a charge-coupled device array.

12. A sensor as recited in claim 8 wherein said photodetector array is a charge-injection device array.

13. A sensor as recited in claim 8 wherein said photodetector array is a charge-coupled device array.

14. A sensor as recited in claim 1 wherein said array of circular apertures comprises small circular apertures arranged in rows and columns.

15. A sensor as recited in claim 14 wherein said array of said circular apertures are arranged in rows and columns having a predetermined variable spacing between said rows and columns.

16. A sensor as recited in claim 15 wherein said rows and columns are arranged so that the center-to-center spacing between any two adjacent rows is different and the center-to-center spacing of any two adjacent columns is different.

17. A sensor for measuring the angle of incidence of a beam of collimated radiation striking said sensor comprising:

(a) a housing having a first end oriented to receive the incident beam;

(b) an aperture plate disposed in said first end of said housing for receiving said incident beam, said aperture plate being opaque to said incident beam and having an array of circular apertures arranged in a predetermined pattern, said apertures being transparent to said incident beam, incident radiation passing through said apertures producing a radiation spot pattern related to the angle of incidence of said radiation relative to the sensor; and (c) means for detecting said spot pattern, said means for detecting being disposed behind said aperture plate and coaxial with said aperture plate, said means for detecting and said aperture plate being sufficiently separated so that the detected spot pattern is related to the angle of incidence of the beam on said aperture plate.

18. A sensor as recited in claim 17 wherein said array of circular apertures comprises small circular apertures arranged in rows and columns.

19. A sensor as recited in claim 18 wherein said array of said circular apertures are arranged in rows and columns having a predetermined variable spacing between said rows and columns.

20. A sensor as recited in claim 19 wherein said rows and columns are arranged so that the center-to-center spacing between any two adjacent rows is different and the center-to-center spacing of any two adjacent columns is different.

* * * * *